UNITED STATES PATENT OFFICE.

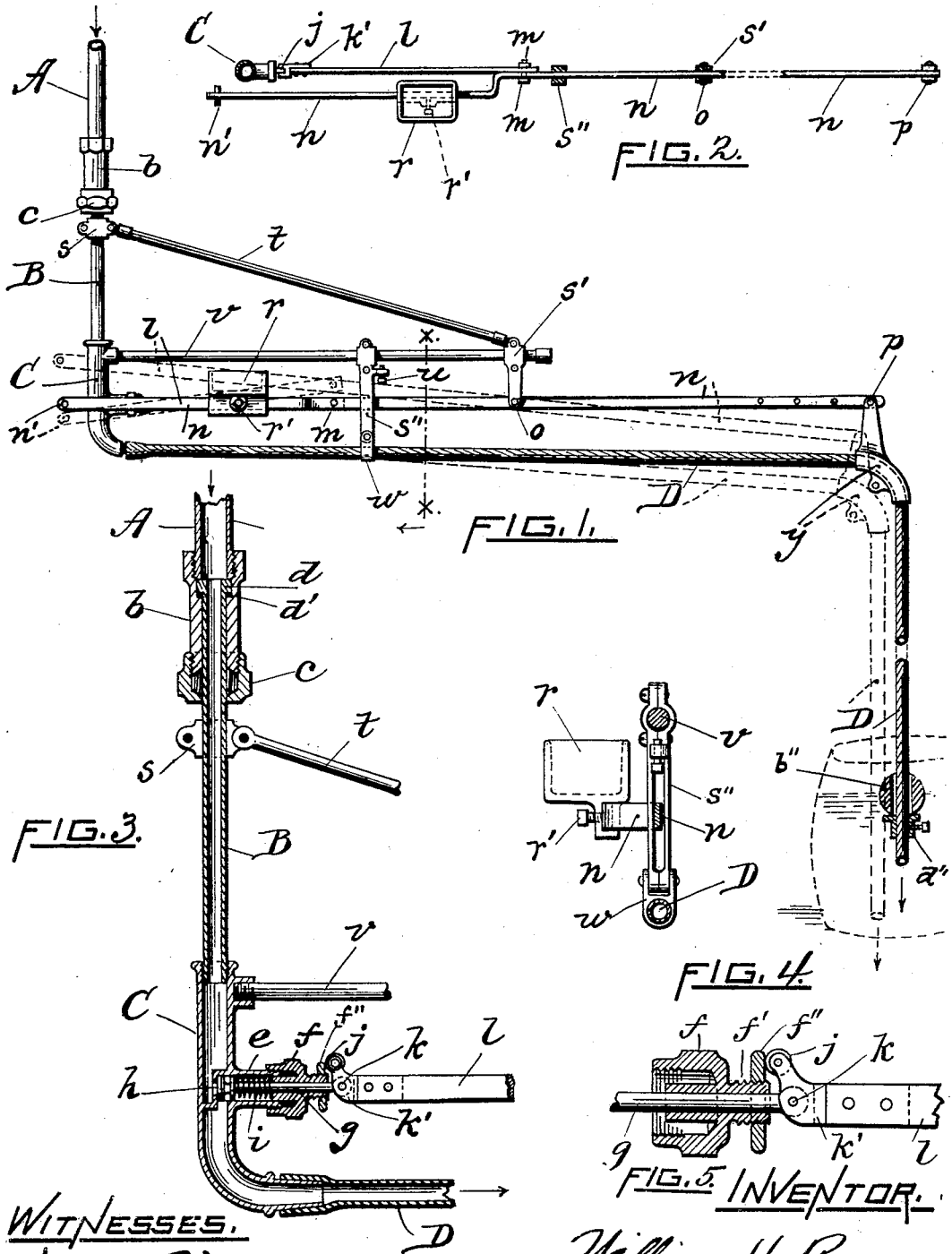

WILLIAM H. RAWE, OF PAWTUCKET, RHODE ISLAND.

COMBINED CARRIAGE-WASHING AND AUTOMATIC WATER-LEVEL-REGULATING DEVICE.

SPECIFICATION forming part of Letters Patent No. 630,740, dated August 8, 1899.

Application filed February 14, 1899. Serial No. 705,516. (No model.)

*To all whom it may concern:*

Be it known that I, WILLIAM H. RAWE, a citizen of the United States of America, and a resident of Pawtucket, county of Providence, and State of Rhode Island, have invented certain new and useful Improvements in a Combined Carriage-Washing and Automatic Water-Level-Regulating Device, of which the following is a specification.

My invention relates to a combined carriage-washing and automatic water-level-regulating device in which a vertical pipe capable of rotation by means of a suitable joint has connected with it at right angles an arm carrying a flexible hose, said arm and hose rotating through a horizontal circle by the rotation of said pipe and the vertical part of said hose being fitted with a float for use in connection with a water tank or barrel.

The purpose of my invention is to provide a device for washing carriages in which by a slight pull upon the hose the water-supply will be turned on and will be automatically shut off when the hose is released, and also to provide a means for maintaining automatically a constant level in a tank or reservoir of water or other liquid. I accomplish these purposes by the mechanism shown in the accompanying drawings, in which—

Figure 1 is a general view of my invention, shown in its normal position; Fig. 2, a vertical view of a portion of the automatically-closing mechanism; Fig. 3, a sectional view of a part of Fig. 1; Fig. 4, an end sectional view through $x\ x$ of Fig. 1, and Fig. 5 an enlarged view of the valve mechanism, shown on a smaller scale in Fig. 3.

The same letters are used to designate like parts throughout the various views.

In Fig. 1, A is a fixed vertical pipe connected with the city or other water-supply.

$b$ is a joint, seen in section in Fig. 3 and having a stuffing-box $c$.

$s$ is a clip fixed upon the pipe B and carrying the supporting-arm $t$.

B is a pipe capable of rotating by means of the joint in $b$ and having at its lower extremity the member C, to which is fixed the arm $v$, connected with the support $t$ by the joint $s'$, said member C terminating at its lower extremity with a hose connection and having in it the valve shown at $h$ in Fig. 3.

$n\ n$ is a lever having its fulcrum at $o$. Attached to this lever by a movable joint at $m$ is the arm $l$, (seen best in the vertical view in Fig. 2,) which arm connects with the valve $h$, as shown in Fig. 3. Attached to the lever $n\ n$ by the set-screw $r'$ is the hollow counterweight $r$, capable of being moved along the lever $n\ n$ from point to point as desired. The member $s''$ is an attachment to the horizontal arm $v$ and serves to carry the flexible hose D and the limiting-bolt $u$, which limits the throw of the lever $n\ n$. At its outer extremity the lever $n\ n$ supports the flexible hose D by the attachment $y$, being movably jointed at $p$. The flexible hose thus runs horizontally until it makes a vertical turn at $y$, and at the lower extremity is fitted with a suitable nozzle.

The joint about which the rotatable pipe B revolves is shown in section in Fig. 3, in which A is the fixed water-supply; $b$, the body of the joint; $d$, the head of the revolving pipe B, and $d'$ a suitable washer or packing rendering the joint tight, $c$ being a stuffing-box or gland of the usual pattern.

$h$ (shown in Fig. 3) is a self-closing valve operated in part by the spiral spring $i$ and in part by the auxiliary arm $l$ of the lever $n\ n$. The valve-stem $g$ is connected with the extremity of the lever $l$ by the attachment $k'$ and the pin $k$, the joint made by $k$ being a movable joint. The extremity of $k'$ is bent near the pin $k$ almost at right angles, the projection carrying a wheel or roller $j$, free to revolve in bearings in said projection. This roller $j$ bears upon an adjustable collar $f'''$, which engages by a screw-thread the outer extremity of the gland $f$, the position of $f''$ determining the travel of the valve-stem $g$ when the lever $l$ is operated, as hereinafter described.

Shown upon the vertical portion of the hose D in Fig. 1 is a float $b\ b$, preferably of a spherical form, having the hole so large as to enable it to slide easily up and down the hose D. $a\ a$ is an adjustable collar having a set-screw which can be fixed upon the hose D at any point desired.

The operation of my device for the purpose of washing carriages or other similar purposes is as follows: The counterweight $r$ is of such a weight and is fixed at such a point upon the lever $n$ as to sustain the weight of the hose D, with its attachments, and keep the valve $h$ normally closed, it then being in a horizontal position, as shown by the full lines in Fig. 1. When it is desired to start the water through the hose, a slight pull is given upon the lower extremity of the vertical part of the hose D. This depresses the end $p$ of the lever $n$ and elevates the opposite end of $n$ through the pivot $o$, the joint at $m$ being a loose joint, and the auxiliary arm $l$ of the lever $n$ being movably attached to the valve $h$ by the stem $g$ and the pin $k$. It follows that as the joint $m$ rises with the lever $n$ the roller $j$ through its bearing upon the collar $f''$ exerts a pull upon the valve-stem $g$ and opens the valve and the water begins to flow and remains flowing so long as a slight tension is exerted upon the vertical part of the hose D. The instant the hose is released the counterweight $r$, together with the spiral spring $i$, brings the lever $n$ back to a horizontal position and the valve $h$ closes automatically. Instead of the counterweight $r$ being in a box form an ordinary perforated weight may be attached by a suitable set-screw to the lever $n$. At the extremity of $n$ is a pin $n'$, limiting the travel of the box $r$. The spiral spring $i$ is not indispensable to the automatic operation of my invention, as it will work by the weight of $r$ alone; but the spring $i$ adds to its efficiency.

It is not necessary for the operation of my device that the hose D should extend the whole distance from the clip $y$ to the lower extremity of the member C, as the member C may be continued horizontally as far as the clip $s''$, or even farther, and the valve $h$ would operate equally well if placed in such horizontal portion of the member C by very slight modification of the form of the lever $n\,n$ and its auxiliary $l$.

A spiral spring connected with the lever $n\,n$ at or about the location of the counterweight $r$ may be substituted also for the counterweight $r$ without changing the nature or operation of my device.

The attachment $b''$, with the collar $a''$, is used for automatically filling and sustaining a constant water-level in as many tanks, barrels, vats, &c., as may come within the range of the device and operates as follows: $b''$ is of such a weight as to normally open the valve $h$, and yet sufficiently light to float readily in the water or other liquid with which the tank or other reservoir is to be filled. The collar $a''$ is adjusted at or a little below the level at which the water or other liquid in the tank is desired to be kept. If the water for any cause falls below said level, the weight of the float $b''$ bearing down upon the hose D through the collar $a''$ opens the valve $h$ and the water rises in the tank until its height is such as to float $b''$, thus releasing D of its weight and closing the valve $h$. The arm of the lever $n$ nearest the end $p$ may be perforated, as shown, by a number of holes for changing the position of the clip $y$. When not needed, the float and collar may be easily removed.

It will be readily seen that by inverting the attachment $k'$ so that the roller-carrying projection shall turn downward the valve $h$ will remain closed while $n$ and D are at their lowest position, as seen in the dotted lines in Fig. 1, in which case the operation of my device would be reversed and the valve would be opened by raising the nozzle slightly, thus relieving the lever $n\,n$ of its weight. It will also be seen that it is possible to operate my device, even when the hose is not connected with the lever $n\,n$, by simply attaching to the end $p$ a chain or string, which may be pulled by the person using the hose; but the preferable method of use is, as shown, by a pull on the vertical part of the hose D.

I am aware that prior to my invention carriage-washing devices have been used in which a horizontal pipe having a flexible hose attached is by means of a suitable joint adapted to rotate through a horizontal circle. I do not therefore claim, broadly, such a device; but What I do claim, and desire to secure by Letters Patent, is—

1. In a combined carriage-washing and automatic water-level-regulating device, the combination of a rotatable pipe connected with a fixed water-supply; a flexible hose attached to said rotatable pipe; and a valve situated in said rotatable pipe between the water-supply and the flexible hose, and adapted to open and close by means of a lever $n\,n$, connected with said valve, all substantially as described.

2. A combined carriage-washing and automatic water-level-regulating device consisting of a rotatable pipe attached to a water-supply; a horizontal arm $v$ connected and rotating therewith; a lever $n\,n$ supported by said arm; a flexible hose attached to the end of said rotatable pipe and supported by said lever and turning vertically downward at the outer extremity of the same; and a valve situated in said rotatable pipe and so connected with said flexible hose by means of said lever that said valve may be operated by a change of tension in the vertical portion of said hose, substantially as described.

3. In a combined carriage-washing and automatic water-level-regulating device, the combination of a rotatable pipe attached to a fixed water-supply, and having a horizontal arm fixed thereon supporting a lever $n\,n$, pivoted at $o$, said lever having at its outer end the clip $y$ for supporting a flexible hose; with an auxiliary arm $l$ joined at one end movably to said lever and engaging at the other end a valve in said rotatable pipe, so that a change of tension upon the outer end of said lever will operate said valve; said valve itself; and an adjustable counterweight $r$, connected with the inner end of said lever, all substantially as set forth for the purpose specified.

4. In a combined carriage-washing and automatic water-level-regulating device, a rotatable pipe connected with a water-supply; a horizontal lever supported by an arm attached to said rotatable pipe at right angles thereto; a valve in said rotatable pipe operated by said lever; a flexible hose connected with said rotatable pipe and running horizontally parallel with said lever, and attached thereto by the clip $y$; an adjustable counterweight $r$, attached to said lever at its inner end and operating to keep said valve normally closed; the whole in combination with a float $b''$ sliding easily upon the vertical part of said hose, and an adjustable collar $a''$ limiting the downward travel of $b''$, all substantially as set forth.

Signed by me at Pawtucket, Rhode Island, this 10th day of February, 1899.

WILLIAM H. RAWE.

Witnesses:
HENRY H. HASTINGS,
PELLAM J. TUCK.